March 6, 1951          A. C. HOLLIS          2,544,088
DRILL CHUCK
Filed Feb. 25, 1947          2 Sheets-Sheet 1
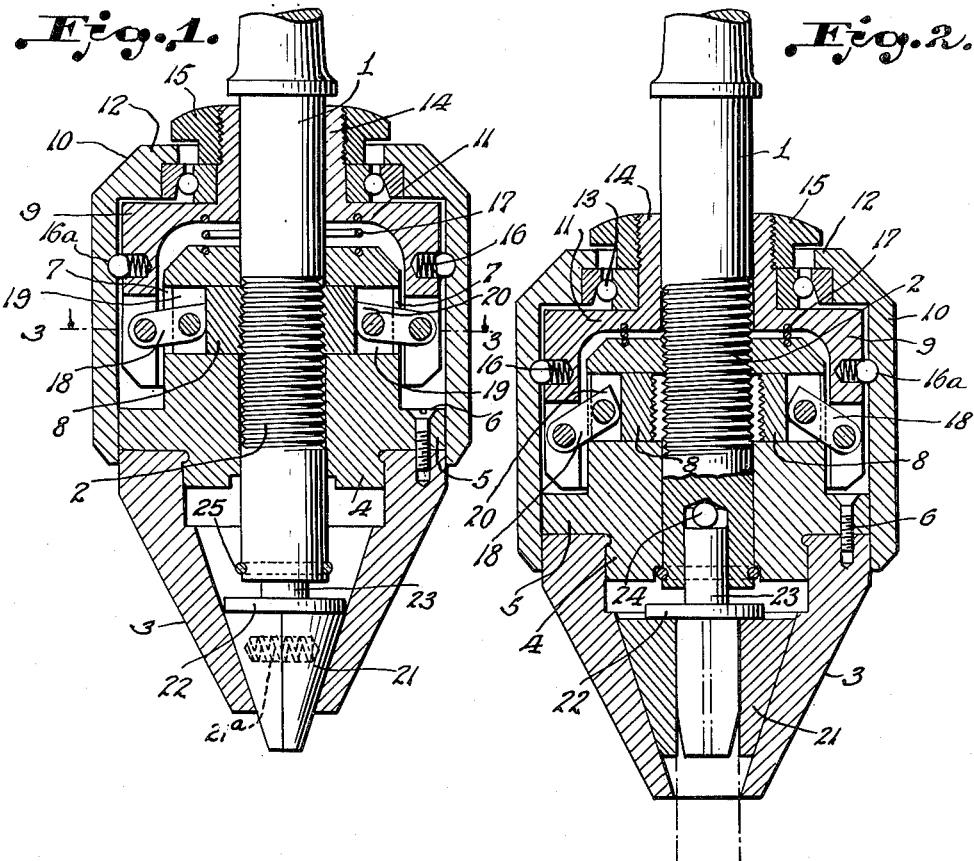
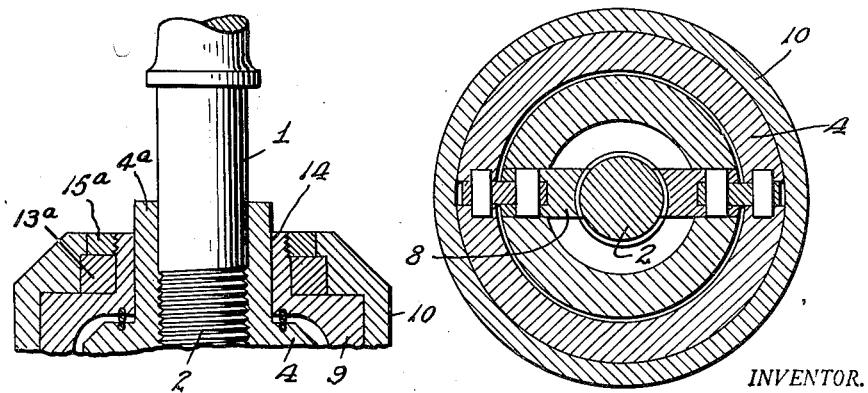
INVENTOR.
Albert C. Hollis
BY
Wenderoth, Lind & Ponack
ATTORNEYS March 6, 1951 A. C. HOLLIS 2,544,088
DRILL CHUCK Filed Feb. 25, 1947 2 Sheets-Sheet 2

INVENTOR.
Albert C. Hollis
BY
Wendoroth, Lind & Ponack
ATTORNEYS

Patented Mar. 6, 1951

2,544,088

UNITED STATES PATENT OFFICE 2,544,088

DRILL CHUCK

Albert Charles Hollis, Watford, England

Application February 25, 1947, Serial No. 730,675
In Great Britain January 31, 1945

Section 1, Public Law 690, August 8, 1946
Patent expires January 31, 1965

1 Claim. (Cl. 279—60)

This invention relates to chucks for holding drills and other tools by gripping the shanks thereof, which are commonly known as drill chucks.

Drill chucks are known in which provision is made, in the form of an operating member of ring or sleeve shape encircling the chuck body, whereby on being axially displaced said operating member effects engagement or disengagement, according to the direction of the axial movement, of means co-operating with the spindle of the drill or some member affixed thereto to result in closing or opening of the tool gripping jaws carried by the chuck. Such a drill chuck permits of tool changing without stopping the rotation of the chuck and also automatically tightens the tool as the load thereon increases. The main object of the present invention is to provide an improved drill chuck of this character.

According to the present invention a drill chuck of the character above specified is provided in which the drill spindle engaging means, such for example as the elements of a split nut, carried by the chuck body are forced into the chuck spindle-engaging position by the intervention of elements having a substantially dead centre of toggle action on said means when an operating member is shifted axially relatively to the spindle.

The intervening elements may be in the nature of loose strut members housed in recesses in the chuck body and made to assume a substantially radial attitude when the operating member is shifted axially in one direction and thereby to exert a dead-centre thrust serving to force the split nut elements or their equivalent into engagement with the drill spindle.

However, in the use of such loose members their disengagement is spontaneous and dependent on a mere falling away of the same from their dead-centre position when a releasing axial movement of the operating member permits such disengagement. Preferable therefore the intervening elements are in the form of links swingably pinned to the operating member and to the split nut elements or their equivalent, such as sliding dogs engageable with recesses in the drill spindle, so that these intervening elements are not only forced into their engaging position with the drill spindle but are also positively pulled out of the engaging position by corresponding axial movement of the operating member. According to a further embodiment of the intervening elements they take the form of cranks each having a crank pin engaging in a slot in the respective split-nut element, the spindle-engaging position of the split-nut elements being produced when the crank pins assume a dead-centre position with respect to the split-nut elements.

The use of intervening strut-like elements having a dead-centre or toggle action as contemplated by this invention affords a simple mechanical transmission between the co-operating members which avoids any possible jamming such as could occur with loose split-nut elements directly co-operating with wedging faces on an operating sleeve, and eliminates any possible failure of the chuck such as could occur if loose spring elements were used and became broken and moved about without control within the chuck.

In known devices it has been proposed, as already indicated, that loose split nut elements should make direct contact with an operating sleeve, but such contact must tend to impose a dragging action on the operating sleeve when the machine operator grips the sleeve by hand for the purpose of first bringing the sleeve into a stationary condition and then moving it axially to effect release of the chucked drill. Any such tendency to drag is avoided in the present invention by utilising as the direct operating member for the intervening elements an inner member located between the chuck body and an outer sleeve. The inner member and the chuck body are coupled together for normal simultaneous rotation by providing for light frictional engagement therebetween, this frictional engagement being overcome readily by the grasping by hand of the outer sleeve, so that the sleeve and inner member can be axially displaced while the sleeve is held against rotation, the inner member continuing to rotate with the chuck body with which it is coupled by the intervening elements.

Spring means are employed to thrust axially apart the revolving chuck body and the inner member so that the latter normally urges the intervening elements to thrust the split-nut elements into engagement with the chuck spindle. Expansion of the split nut elements to result in release of the drill is effected by manually overcoming the resistance of said spring sufficiently to cause axial displacement of the sleeve and inner member.

Several embodiments of the invention are illustrated in the accompanying drawings, wherein—

Figures 1 and 2 are vertical sectional elevations of a construction employing pivoted links directly controlling the split-nut elements and shown in the closed and opened positions respectively.

Figure 3 is a sectional view on line 3—3 of Figure 1.

Figure 4 is a detail view of a modified form of bearing for the chuck body.

Figure 5:
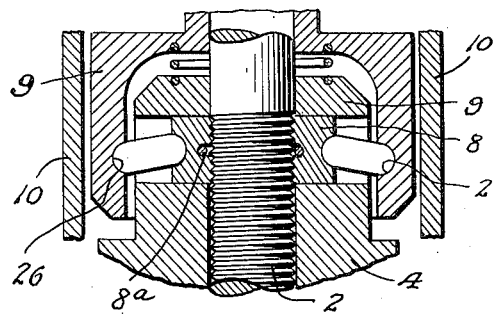
Figure 5 is a fragmentary cross sectional view showing a construction employing link-operated eccentrics for controlling the split-nut elements, the latter being shown in the closed position.

Referring first to the embodiment shown in Figures 1, 2 and 3 the chuck spindle 1 has its upper extremity formed parallel or with a male taper shank or female taper shank according to the type of drilling machine spindle it is intended to fit, a male taper shank being shown. The lower portion 2 of the chuck spindle 1 is screwthreaded and this screwthreaded portion supports a chuck body comprising a hollow tapering nose portion 3 and an upper head portion 4 having a flange 5 apertured for the passage therethrough of screws 6 by means of which the nose 3 and head 4 are screwed together. The head 4 of the chuck body is formed with a pair of diametrically opposite apertures 7 which slidably accommodate the two halves 8 of a split nut. Encircling the head 4 of the chuck body is the skirt of a hood 9 and concentric with the hood 9 is an outer operating sleeve 10, both the inner member or hood 9 and the outer member or sleeve 10 having top plates 11, 12 carrying respectively the inner and outer portions of a ball bearing assembly 13. Through the bore of the ball bearing assembly extends a boss member 14 forming a tubular extension of the hood top plate 11 said boss 14 being externally screwthreaded to co-operate with a locking nut 15. Light frictional engagement between the skirt of the inner member or hood 9 and the concentric outer member or sleeve 10 is provided for by means of small spring-pressed balls 16 carried in sockets formed in the hood 9 and bearing upon the internal surface of the outer member or sleeve 10. An annular semicircular groove 16a is formed on the internal surface of the said sleeve 10 to serve normally as a race for the balls 16.

Interposed between the top plate 11 of hood 9 and the top face of the chuck body head 4 and encircling the spindle 1 is a coiled compression spring 17 which tends normally to maintain the hood 9 and chuck body head 4 apart.

Links 18 are swingably pinned near their ends to the skirt of the hood 9 and to the split nut halves 8 respectively, the inner ends of the links 16 being received within slots 19 formed in the nut halves 8 and made with toe portions 20 which, by contacting with the ends of the nut slots 19, limit the upward swing of the links 18 and determine the pressure exerted by the nut halves 8 on the screwthreaded portion 2 of the chuck spindle 1 when the links arrive at substantially the dead-centre position shown in Figure 1 from the inclined position shown in Figure 2.

Within the hollow tapering nose 3 of the chuck body is accommodated a set of chuck jaws 21 of known form with coil springs 21a provided between adjacent jaws 21 which tend normally to spread said jaws 21 to the open position. This tendency of the jaws 21 to open is counteracted by maintaining the jaws 21 pressed against the inner face of the tapered nose 3 by means of a pressure member comprising a flat plate 22 with stem 23 which enters a hollow formed in the lower extremity of the chuck spindle and presses against a ball 24 trapped between the top of the stem and the bottom of the spindle hollow. This antifriction device for the jaw pressure member reduces friction between the chuck spindle 1 and the jaws 21 as the load on the jaws 21 and the chucked drill increases.

Increase of the load on the drill automatically tightens the drill in the chuck, thus obviating the use of chuck keys or the like; such automatic tightening of the drill is a feature common to drill chucks of the character to which this invention relates.

The position of the component parts when operating normally are shown in Figure 1, whilst Figure 2 shows the disposition of the component parts when the machine operator has grasped the sleeve 10 by hand and has displaced same axially in a downward direction (against the action of spring 17) to disengage the nut halves 8 from the chuck spindle 1 through the pivotal linking of the nut halves 8 with the hood 9 which is coupled to the operating sleeve 10, thereby to move the chuck nose 3 away from the jaws 21 so that they automatically open. A spring wire clip 25 seated in a circumferential groove on the wall of the chuck spindle near its lower end serves as a stop for the lowering movement of the upper head portion 4 of the chuck body.

Assuming that the drill chuck above described is mechanically held in a machine head, the operator has two free hands for the operations of inserting and withdrawing a tool. To insert a tool the operator, holding the tool in one hand, grasps the sleeve 10 of Figure 1, with the other hand notwithstanding the fact that it may be rotating, depresses it together with the hood 9 against the resistance of the spring 17, and thereby rocks the links 18 sufficiently to withdraw the nut halves 8 from engagement with the threaded portion 2 of the spindle 1. The operator continues to depress until the condition illustrated in Figure 2 is reached, whereupon the tool can be inserted between the open chuck jaws 21. The operator then releases his grasp of the sleeve 10, thereby causing the spring 17 to re-assert itself, thereby causing the inclined links 18 to recover their substantially dead-centre position in which they keep the split nut halves 8 in engagement with the threaded spindle 2.

Ignoring for the moment the function and effect of the spring loaded balls 16 and the groove 16a it will be understood that so long as the chuck jaws are required to be open the chuck sleeve must be held in the depressed position. This is no great disadvantage if two free hands are available for manipulation as above stated, but frequent use of drill chucks is made in power operated portable drills such as those of the pistol-grip type where one hand is occupied in holding the whole implement and only one hand is free for manipulation. In such cases the function and effect of the balls 16 and groove 16a is valuable. It will be understood that when the operator, holding the implement in one hand, depresses the sleeve 10 with the other hand thus passing from the condition of Figure 1 to that of Figure 2, the parts will remain in the position of Figure 2 when his hand is removed because the balls 16 will cling to the groove 16a. The removed hand is therefore free to pick up and insert the tool into the open jaw. If the operator continues to hold the implement as a whole in the one hand and thrusts inwardly upon the implement by means of the tool held in the other hand he will overcome the clinging action of the balls 16 in the groove 16a and thereafter cause the links 18 to close the nut halves 8 on to the threaded spindle.

Referring now to the modification shown in Figure 4, it is seen that a solid bronze bearing ring 13a clamped to hood 9 by 15a is employed instead of the ball bearing of Figures 1 and 2. Also the upper portion of the chuck body is provided with a long tubular extension 4a giving stability and extensive wearing surface.

It has already been stated that instead of the positively anchored links 18 loose strut-like members 26 may be used. This modification is illustrated in Figure 5. It will be understood as the struts do not positively draw back the split nut halves when the sleeve is depressed a split spring ring 8a or the like is required to disengage the split nut halves from the spindle.

Figure 6:
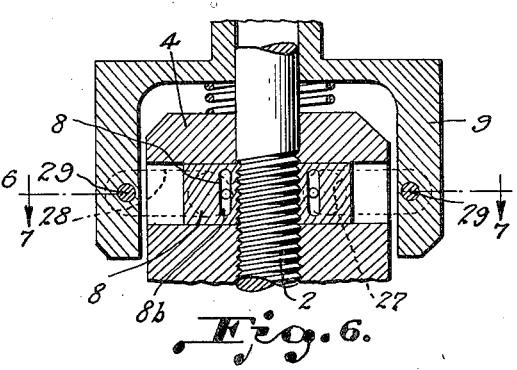
Figure 6 is a fragmentary cross sectional view showing a construction employing link-operated split-nut elements, the latter being shown in the closed position.
Figure 7:
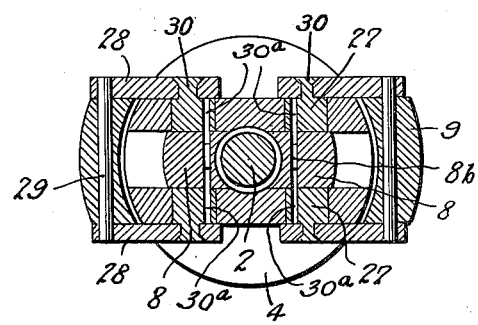
Figure 7 is a cross section on line 7—7 of Figure 6.
Figure 8:
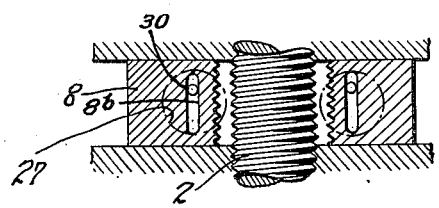
Figure 8 is a detail view showing the split-nut elements of the Figure 6 construction in opened position.

In Figures 6, 7 and 8 a further modification is shown in which the moving of the split nut halves 8 into and out of engagement with the threaded portion 2 of the spindle is effected by providing for each split nut element 8 a pair of small shafts 27 each pivotably connected by eccentric pins 30 to a pair of links 28 anchored by a cross pin 29 to the slidable hood 9, each shaft 27 carrying an eccentric pin 30a for engaging in a slot 8b in the split nut element 8, the arrangement being duplicated for symmetry of action and design. By reason of the interconnection between the shafts 27 and hood 9 through the links 28 any sliding adjustment of the hood 9 rocks each shaft 27 and thereby reciprocate the nut elements 8 simultaneously.

What I claim is:

A drill chuck comprising in combination a chuck spindle, a chuck body with a hollow tapered nose supported by the spindle which extends down into the nose, elements forming a split nut threaded for co-operation with a threaded portion of the chuck spindle and housed for radial movement in apertures in the upper part of said chuck body, a hood member encircling the upper part of the chuck body and slidable over the chuck spindle, links pivotally connected to the nut elements and the hood, so that axial displacement of the hood effects expanding or contracting movement of the nut elements, a sleeve concentrically encircling and coupled to the hood, an anti-friction bearing between the hood and sleeve which are arranged to rotate together by reason of light frictional engagement therebetween, a coil spring encircling the chuck spindle and extending between the hood and chuck body normally to maintain them in the position in which the nut elements engage the chuck spindle, a set of floating spring-expanded tapered jaws in the nose of the chuck body, a pressure plate bearing upon the jaws to hold said jaws in closing contact with the chuck body nose, said plate having a stem which enters a hollow in the lower extremity of the chuck spindle, and an anti-friction bearing ball between the end of the pressure plate stem end and the end of the chuck spindle hollow.

ALBERT CHARLES HOLLIS.

REFERENCES CITED

The following references are of record in the file of this patent:

UNITED STATES PATENTS

| Number | Name | Date |
| --- | --- | --- |
| 396,035 | Felt | Jan. 8, 1889 |
| 1,907,553 | Lundin | May 9, 1933 |
| 2,114,305 | Johansen | Apr. 9, 1938 |
| 2,253,345 | Palmgren | Aug. 19, 1941 |

FOREIGN PATENTS

| Number | Country | Date |
| --- | --- | --- |
| 46,237 | France | of 1936 |
| 191,959 | Great Britain | of 1923 |
| 285,589 | Germany | of 1915 |